United States Patent [19]
Langston et al.

[11] 3,807,565
[45] Apr. 30, 1974

[54] SEWAGE DISPOSAL SYSTEM

[75] Inventors: William C. Langston, Wall Twsp.; Donald W. Smith, Sea Girt, both of N.J.

[73] Assignee: Aerobiotic Sciences Inc., Jersey City, N.J.

[22] Filed: July 3, 1972

[21] Appl. No.: 268,929

[52] U.S. Cl................. 210/201, 210/203, 210/220, 210/263, 210/316, 210/318
[51] Int. Cl............................................. B01d 23/04
[58] Field of Search........ 55/387, 524, 529; 210/15, 210/17, 60, 170, 181, 202, 203, 220, 221, 266, 315, 201, 263, 316, 318

[56] References Cited
UNITED STATES PATENTS

| | | | |
|---|---|---|---|
| 3,440,669 | 4/1969 | Boester | 210/220 X |
| 3,515,278 | 6/1970 | Wilson | 210/202 X |
| 3,217,471 | 11/1965 | Silverman | 55/387 X |
| 3,503,876 | 3/1970 | Stone | 210/220 X |
| 1,900,809 | 3/1933 | Hammerly | 210/221 X |
| 2,296,437 | 9/1942 | Green | 210/220 X |
| 1,149,750 | 8/1915 | Greth et al. | 210/202 X |

*Primary Examiner*—John Adee
*Assistant Examiner*—Robert H. Spitzer

[57] ABSTRACT

An aerobiotic sewage disposal system including a primary comminution or break up chamber wherein gross incoming solids are broken up and partially oxidized as they pass within a fiberglass cone with the bottom of this conical hopper having a circular aerator positioned so as to provide only a thin annular passage so that only minute solid particles may escape the cone compartment after being reduced in size through aerobic action. The secondary treatment is strained through a filter placed around the conical hopper so that, by aerobic action, the biological filtering can be completed. This filter bag is formed of a "sandwich" of polyester deep pile inner lining with a center of activated charcoal and a outer polyester cloth. The second aerator is placed around the bottom surface of the unit, with the bottom wall of the unit being convex so that minute suspended solids which may pass through the filter bag, would tend to settle around the bottom edge of the unit, and would be agitated by the aerator which is in the lowermost corners of the unit and prevents any accumulation of sludge.

A third filter is provided for completing filtration with a weir type pick up being provided for collecting the effluent.

9 Claims, 4 Drawing Figures

SEWAGE DISPOSAL SYSTEM

BACKGROUND OF THE INVENTION

Waste water treatment systems are intended to decompose organic contaminants found in household sewage waste. Different types of systems have been utilized, and one of the more recent developments has been the utilization of a biological filtering through aerobic action achieved by constant aeration.

One such aerobic waste disposal unit manufactured by Cromaglass, Williamsport, Pa. 17701 has a "Cromoglass Single Home Sewage Disposal System". This type of system is shown in U.S. Pat. No. 3,210,053; U.S. Design Pat. Nos. D207,293 and D207,294 and other systems are shown in U.S. Pat. Nos. 3,543,294; 3,440,669 and 3,487,015.

However, none of the systems presently available provide so intensive, extensive and rapid an aeration of the sewage materials such that they are quickly deodorized and completely dissipated. Thus, it would be useful to have a system wherein any odor detected is a quick indicator that the system is in need of attention for optimum performance. Further, there is a need to provide a system which avoids sludge buildup at the bottom of the tank and further limits the need for replacing filters and insures complete aerobiotic action on any sludge film around the filters. Additionally, systems presently utilized do not achieve total clarification of the water and the effluent of the systems presently available does, under heavy load conditions, come out with a color which is not acceptable. Further, it would be very useful to be able to have a sewage disposal system of supplying its effluent directly to the water table.

SUMMARY OF THE INVENTION

The present invention is directed to a sewage disposal which will take, directly, contaminated water from a house, and then by passing it through the system, filtrate, decontaminate, and cleanse the water to make it as clear as spring water so that it can be recycled back for toilet flushing, bathing and washing, odor free, clarified, and with proper clorination made germ free. In this system, the sewage is deposited into the aerated tubular cone which has an annular opening at the bottom thereof providing a minimum passageway to the secondary treatment chamber outside the cone area. The aerator process breaks up the organic solids through the constant tumbling and in fact activates and oxidizes the water with these bubbling streams of air. Organic solids are loaded with bacteria which feeds on the organic matter, converting the bacterial food into celluloid tissue and consuming the consumed food as air and liquid with a microscopic organic residue (comparable to bacterial feces) which the new crop of bacteria then eats. The life span of the bacteria is a few seconds to a few minutes. The tubular cone is surrounded by a combination filter bag comprised of an inner deep pile polyester felt material, an inner activated charcoal honeycomb filter, and an outer sheen or smooth polyester base material. The liquid which must pass from the cone to the second filter runs down the bacterial scum surface of the inner polyester layer and is seived out through the first polyester deep pile envelope. Then, it passes through the activated charcoal honeycomb to remove the mineralized pigment. Passing through the first polyester felt element, the sewage liquid is clarified. Passing through the honeycomb charcoal filter, the mineralized pigments and organic coloring are screened out leaving the filtered effluent clear as spring water.

As raw untreated sewage enters the system, an equal amount of primary treated solution is displaced from the tumbling cone into the secondary treatment chamber between the cone and the filter bag. The force of the continuing bubbling aerating liquid is whirlpooled to the thick pile of the inner polyester felt layer where it sticks, being instantly attacked by aerobes as a bacterial-organic scum is formed, clinging to the sides of the polyester felt filter until it is consumed by the bacteria. This process is known as bacterial filtering, that is, the organic matter is microscopically filtered through the digestive processes of short lived bacterial organisms by ingestion and digestion. The aerobic bacteria are cannabalistic; they are voracious microscopic animals and will atack attack organic. If there is no organic sewage material, they will attack each other after a period of time the bacterial process then stops until the flushing of a toilet reactivates the system and breaks up sewage floc and a new crop of bacteria within organic solids is provided. The aerobes are micro-organisms that thrive and multiply generations within seconds for minute life spans and absorb the oxygen in the air. The aerobes need oxygen and this is supplied by passing turbulent air the hundreds of thousandths of tiny air bubbles formed by the aerator. The continuous aeration results in the clear effluent somewhat superior to the water ordinarily found in the raw water now being used by most cities.

After passing through the first primary treatment filtering process, the water passes into the secondary treatment area formed of a sandwich of fiberglass honeycomb activated charcoal and polyester felt material. Aeration is provided for aerating the water in this second bag and consequently, to provide aeration around the outside of the first bag so as to prevent the build up of scum thereon. After passing through the second bag, the water passes out into the main body of the unit. The bottom of the unit has a convex surface so that any sludge which might still have passed through the primary and secondary stages will be accumulating at the outer edges of the unit. At the bottommost outer edge of the unit there is provided an annular aerator for preventing any buildup of minute sludge and, further, to aerate the outside of the second filter to assist in the filtration of the cleaned effluent through the final activated charcoal filters and into the weir discharge chamber should it be deemed necessary. Thus, the filter bags are aerated both along their inner and outer surfaces. The water then passes upward and outwardly through an effluent discharge pipe. Alternatively, a third charcoal filter can be provided adjacent to the top of the unit, which filter is annular so as to form a weir around the top edge of the unit into the collection pipe. This prevents undue usage of one side edge of the second filter bag, and insures that there is uniform flow 360° about the unit.

DETAILED DESCRIPTION OF THE DRAWINGS

Figure 1:
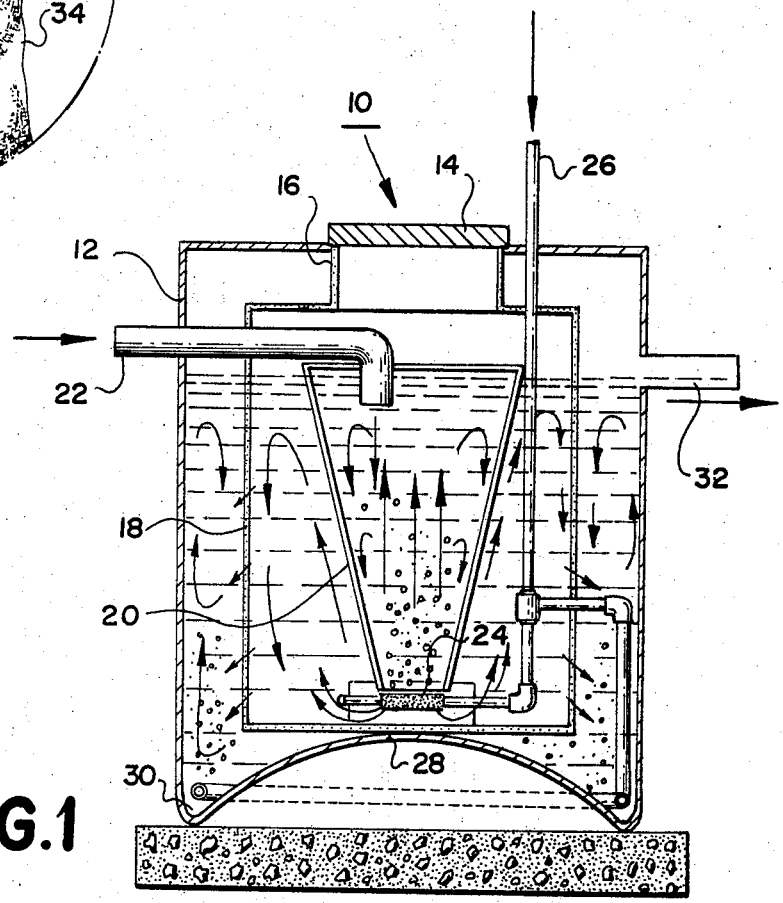
FIG. 1 is a diagram showing the first embodiment of the present invention.
Figure 3:
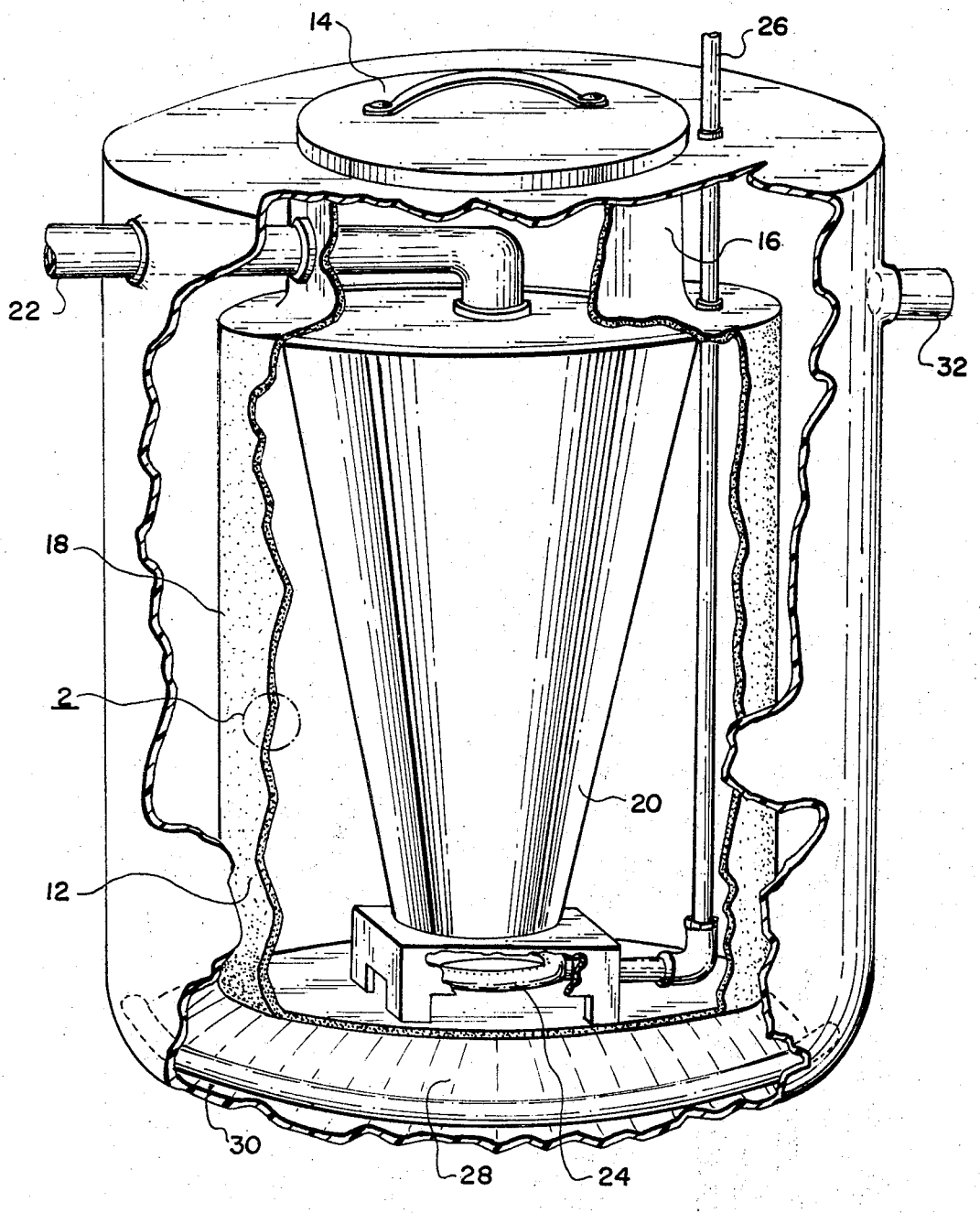
FIG. 3 is a partially broken away view of the sewage disposal system shown in FIG. 1.

In FIG. 1, there is shown a sewage disposal system of the present invention generally designated by the number 10. Disposal system 10 includes a generally cylindrical tank 12 having a manhole type cover 14 on the top thereof. The cover 14 covers a suitable outer envelope of fiberglass or steel, 16 open at its top which envelope 16 includes a cup-shaped outer filter envelope 18. A conical inner filter envelope 20 is coaxial with the envelope 18 and has its open end below the manhole 14. An influent pipe 22 passes through the side wall of the casing 12, the side wall of the envelope 18, into the conical envelope 20. Thus, sludge and solid waste suspended water are dropped into the cone 20. The bottom end of the cone 20 has positioned therebelow a circular aerator 24 thus leaving a small annular opening between the bottom edge of the cone 20 and the surface of the aerator 24. The aerator 24 is supplied air under pressure from a suitable conduit 26. The bottom surface of the casing 12 is convex as shown in 28 and, at the outer end of the convex surface 28 and thus the lowermost point of the casing 12 there is placed an annular aerator 30 also supplied with air from the conduit 26. Effluent from the system passes out through a suitable effluent conduit 32.

In operation, the sewage matter enters through influent pipe 22 into cone 20. There, the thousandths of bubbles generated by the aerator 24 breaks up the sewage floc (organic solids). These organic solids are loaded with bacteria which feed on the organic matter, converting the bacterial food in cellular tissue and expelling the consumed food as air and liquid with a microscopic organic residue (comparable to bacterial feces) which the new crop of bacteria then eats. The life span of the bacteria is a few seconds to a few minutes.

Figure 2:
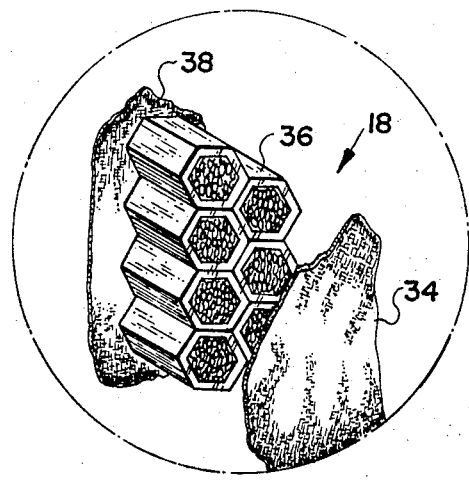
FIG. 2 is an exploded view of one of the filter bags shown in FIG. 1.

The expelled liquid runs down the bacterial scum surface formed on the inner polyester deep pile filter 34. As shown in FIG. 2 the envelope 18 consists of an inner polyester deep pile felt filter 34, a honeycomb activated charcoal filter 36, an outer polyester filter 38.

The expelled liquid runs down the bacterial scum surface on fiberglass filter 34 and seives out therethrough. Additionally, liquids pass through the annular passage at the base of the cone. Prior art devices did not utilize an annular aerator, but rather they used cylindrical aerators thus leaving large openings for the passage of solids out of the cone 20. By utilizing a thin annular opening, there is provided uniform aeration of any liquids which might pass through the bottom of the cone, and further, there is a very real limitation on the size of any particles which could pass through the bottom of the cone by reason of the position of the aerator 24 with respect to the bottom edge of the cone 20. After the expelled liquid is seived out through the first polyester deep pile envelope 34, it then passes through the charcoal filter honeycomb 36 between the two screens of polyester material 34 and 38. Passing through the honeycomb charcoal filter between the two polyester skins, the mineralized pigments are screened out leaving the filtered water pure and clear as spring water.

In reviewing the bacterial process which achieves the above, it should be understood that the primary treated sewage is displaced from the tumbling cone into the first fiberglass envelope 20 and 34 with the force of a continuingly bubbling aerating liquid whirlpooling up to the upper portion of the cone filter bag 34 where it sticks, being instantly attacked by the bacteria, as a bacterial -organic scum is formed, clinging to the sides of the polyester or fiberglass filter 34 until it is consumed by the bacteria. This process is known as biological filtering—that is the organic material is microscopically filtered through the digestive processes of the short-lived bacterial organisms by ingestion and digestion. These bacteria are cannibalistic. They are voracious microscopic animals and they will attack and eat anything organic. If there is no organic sewage matter, they will attack each other and vanish. The bacterial process then stops until the next flushing of the toilet breaks up the sewage floc and a new crop of bacteria attacks the new organic solids. The organic sewage solids are teeming with many types of bacterial microorganisms. The most significant for the purposes of the present system are known as aerobes, a micro-organism that thrives and multiplies generations within seconds or minute life spans and absorbs oxygen from out of the aerated sewage. The aerobes need oxygen and, by providing a continuous and abundant amount of oxygen, the aerobes continue to live attacking the organic solids and the sewage matter. The sewage food is loaded with oxygen-activated aerobes and forms a collodial biological slime on the upper portion of the cone 20 and filter bag 18. The continuous aeration, results in a clear effluent somewhat superior to the water ordinarily found in the raw water now being used by most cities. The resulting effluent will be from 89-98 percent B.O.D. (bio-chemical oxygen demand) and around 97 percent dissipated collodial solids.

It should be noted that the aerobic action occurs on both sides of the cone 20 and interior side of the filter bag 18 so as to prevent any slime accumulation on either side thereof and there is thus no need for cleaning the filters after prolonged usage as all the bacterial slime is removed by aerobic action. In actual practice it has been found that the biological filter as caused by the slime buildup is far superior to any such type filter thus far developed. Further, the aerator 30 operates to prevent any sludge from accumulating at the bottom of the tank 12. The aerator 30 additionally insures aerobic action along the outer surface of the fiberglass filter 38. Thus, the filter 18 and the cone 20 are provided with aerobic action on both surfaces thereof to insure complete aerobic action. The effluent then passes out through the effluent pipe 32, it being understood that the effluent pipe 32 has a bottom edge positioned below the top edge of the hopper 20.

So intensive, extensive and rapid is the aeration of sewage materials which have odors, that one would know that the system is not operating correctly if any odor was detected. During ordinary operation, all odors are quickly deodorized and dissipated.

Of course, it may be necessary with this type of system to check, for example every six months to a year to determine whether any hard objects have gotten into the tumbler cone 20. Whether or not it will be necessary to chlorinate the effluent would depend on whether the local health board would require chlorination, and/or whether the effluent is to be run off into a nearby lake or lagoon. The effluent can, of course, be directly connected up for reflushing of toilets and/or bathing or washing water. It should be noted that this system requires no moving parts or machinery within the tank and that one achieves total clarification of the waste water.

Figure 4:
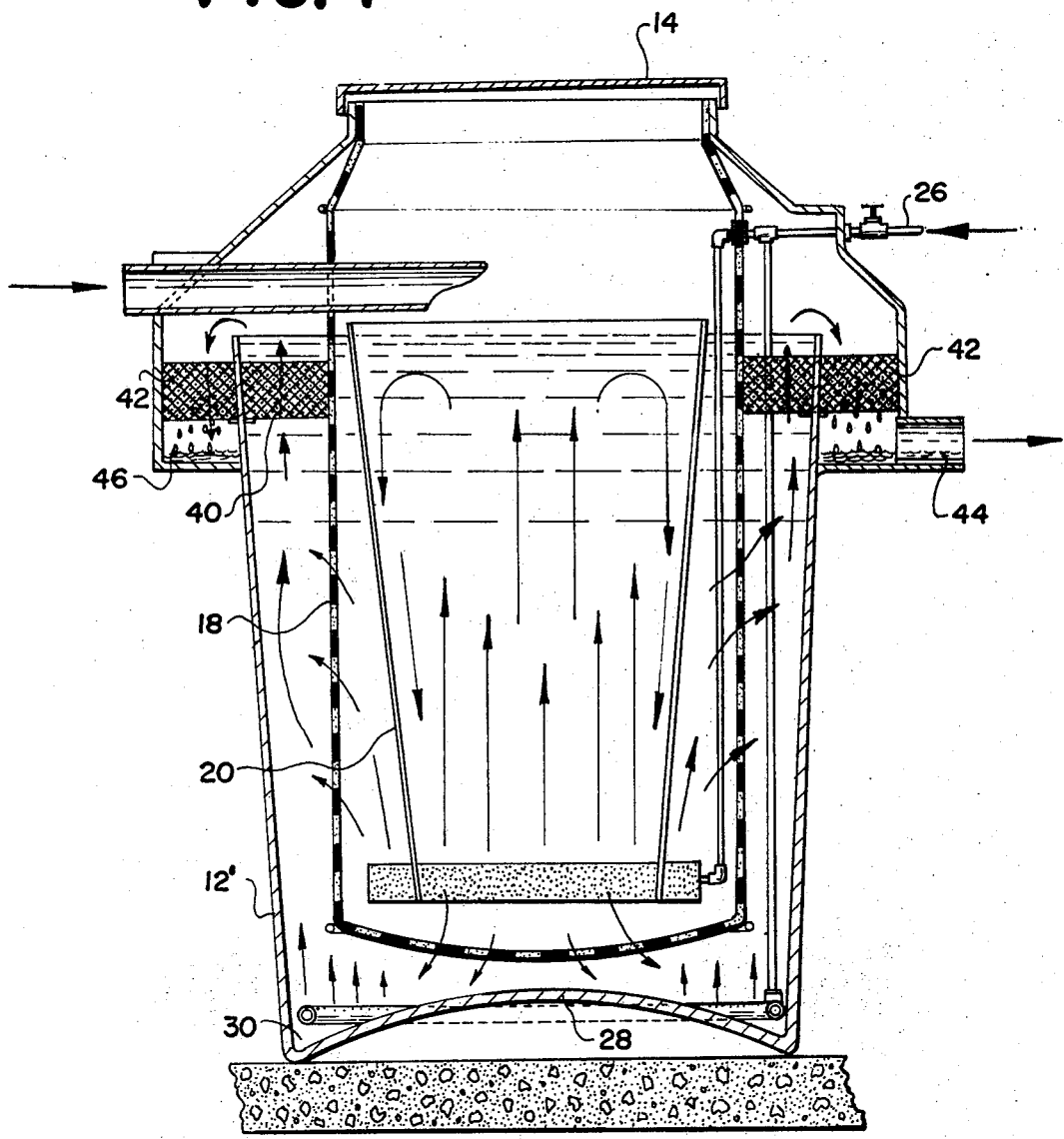
FIG. 4 is a drawing showing another embodiment of the present invention.

An alternative system is shown in FIG. 4. In the system shown in FIG. 4, the only change is the elimination of the effluent line 32 and the substitution therefor of a weir filtration system comprising a pair of annular charcoal filter media 40 and 42. Charcoal filter media 40 is placed between filter envelope 18 and casing 12' with casing 12' consisting of an open end member whose top edge is below the top edge of the cone 20. Water passes up through the charcoal filter media 40 and over the edge of the casing 12' and then onto annular filter media 42 which provides a weir filtration chamber outside of the casing 12'. Thus, liquid is collected all around the casing 12' rather than merely at a single tubular port as occurred with respect to the embodiment of FIG. 1. In this manner, there is no pattern of flow which will cause filtration to be concentrated in one area of one of the filter envelopes rather than uniformly throughout the entire surface of the filter envelopes. Further, the use of the two annular charcoal filters 40 and 42 provides a final filtering step with water before it goes out the effluent pipe 44. The effluent pipe 44 is directly connected to the weir filtration chambers 46 positioned below the annular filter media 42. It should further be noted that filter media 40 will be aerated from its bottom surface so that any bacterial growth will be prevented.

Although this invention has been described with respect to its preferred embodiment, it should be understood that many variations and modifications will now be obvious to those skilled in the art, and it is preferred, therefore, that the scope of the invention be limited, not by the specific disclosure herein, but only by the appended claims.

We claim as our invention:

1. A sewage disposal system comprising:
    a casing;
    a conical envelope having a wide upper opening and a narrow lower opening within said casing; an influent means positioned to supply said conical envelope
    a filter envelope surrounding said conical envelope; and
    first aeration means for supplying, continuously, air to said envelopes, said filter envelope including an activated charcoal filter, and effluent receiving means for receiving water which passes downwardly through said lower opening of said conical envelope and thence through said filter envelope, said first aeration means being positioned to form a uniform annular passageway at the bottommost edge of said conical envelope lower opening.

2. The sewage disposal system of claim 1 wherein said filter envelope includes a honeycomb activated charcoal filter element sandwiched between fibrous filter elements.

3. The sewage disposal unit of claim 2 in which said fibrous filter elements are made of polyester material.

4. The sewage disposal system of claim 1 wherein said effluent receiving means is a weir, said weir extending about the edge of said casing.

5. The sewage disposal system of claim 4 including filtering means about said weir, said filtering means providing a final filter for water before passage out of said casing.

6. The sewage disposal system of claim 5 wherein said weir filtering means is an activated charcoal filter.

7. A sewage disposal system comprising:
    a casing;
    a conical envelope having a wide upper opening and a narrow lower opening within said casing; an influent means positioned to supply said conical envelope
    a filter envelope surrounding said conical envelope; and
    first aeration means for supplying, continuously, air to said envelopes, said filter envelope including an activated charcoal filter, and effluent receiving means for receiving water which passes downwardly through said lower opening of said conical envelope and thence through said filter envelope, and
    second aeration means, said second aeration means being positioned outside of said filter envelope for aerating the outer surface of said filter envelope.

8. The sewage disposal system of claim 7 wherein said second aeration means is positioned adjacent to the lowermost portion of said casing.

9. The sewage disposal system of claim 8 wherein said second aerating means is annular in shape, said casing having its lowermost portion annular in shape, said casing having a convex bottom surface for allowing effluent on the bottom surface thereof to flow toward said annular portion, said second aerating means being positioned within said annular portion.

* * * * *

UNITED STATES PATENT OFFICE
CERTIFICATE OF CORRECTION

Patent No. 3,807,565          Dated April 30, 1974

Inventor(s) William C. Langston et al.

It is certified that error appears in the above-identified patent and that said Letters Patent are hereby corrected as shown below:

Column 1, line 33, after "system" insert -- capable --; line 63, "of" should read -- on --. Column 2, line 19, cancel "atack"; same line 19, before "organic" insert -- anything --. Column 3, line 34, "in" should read -- into --.

Signed and sealed this 1st day of October 1974.

(SEAL)
Attest:

McCOY M. GIBSON JR.
Attesting Officer

C. MARSHALL DANN
Commissioner of Patents